United States Patent [19]

Dybel et al.

[11] 4,289,022
[45] Sep. 15, 1981

[54] LOAD MONITORING SYSTEM WITH MEANS FOR GENERATING TIMING SIGNALS

[76] Inventors: Frank R. Dybel; William P. Dybel, both of 981 Wingate Rd., Olympia Fields, Ill. 60461

[21] Appl. No.: 59,471

[22] Filed: Jul. 20, 1979

[51] Int. Cl.³ .............................................. G01L 1/16
[52] U.S. Cl. .................................. 73/862.64; 100/99; 73/862.68
[58] Field of Search .............................. 368/9; 100/99; 73/141 R, 141 A, 770

[56] References Cited

U.S. PATENT DOCUMENTS

| | | | |
|---|---|---|---|
| 2,644,151 | 6/1953 | Kraeger | 100/99 X |
| 2,924,968 | 2/1960 | Colten et al. | 73/770 |
| 3,303,694 | 2/1967 | D'Onofrio | 73/141 A |

Primary Examiner—Jerry W. Myracle

[57] ABSTRACT

Applicants disclose a load monitoring system for monitoring cyclical loads on the pitman of a production press during operation. The system includes a transducer attached to the pitman of the press to produce an electrical load signal that is proportional to the forces on the pitman. The electrical load signal is connected to an overload/underload detector circuit and to a timing signal generating circuit. In response to the load signal from the transducer, the timing signal generating circuit produces timing signals, including a check pulse, in timed relationship to the cyclical stroke of the pitman.- The timing signals are used to control the operation of the overload/underload detector circuit and other aspects of the press production.

7 Claims, 5 Drawing Figures

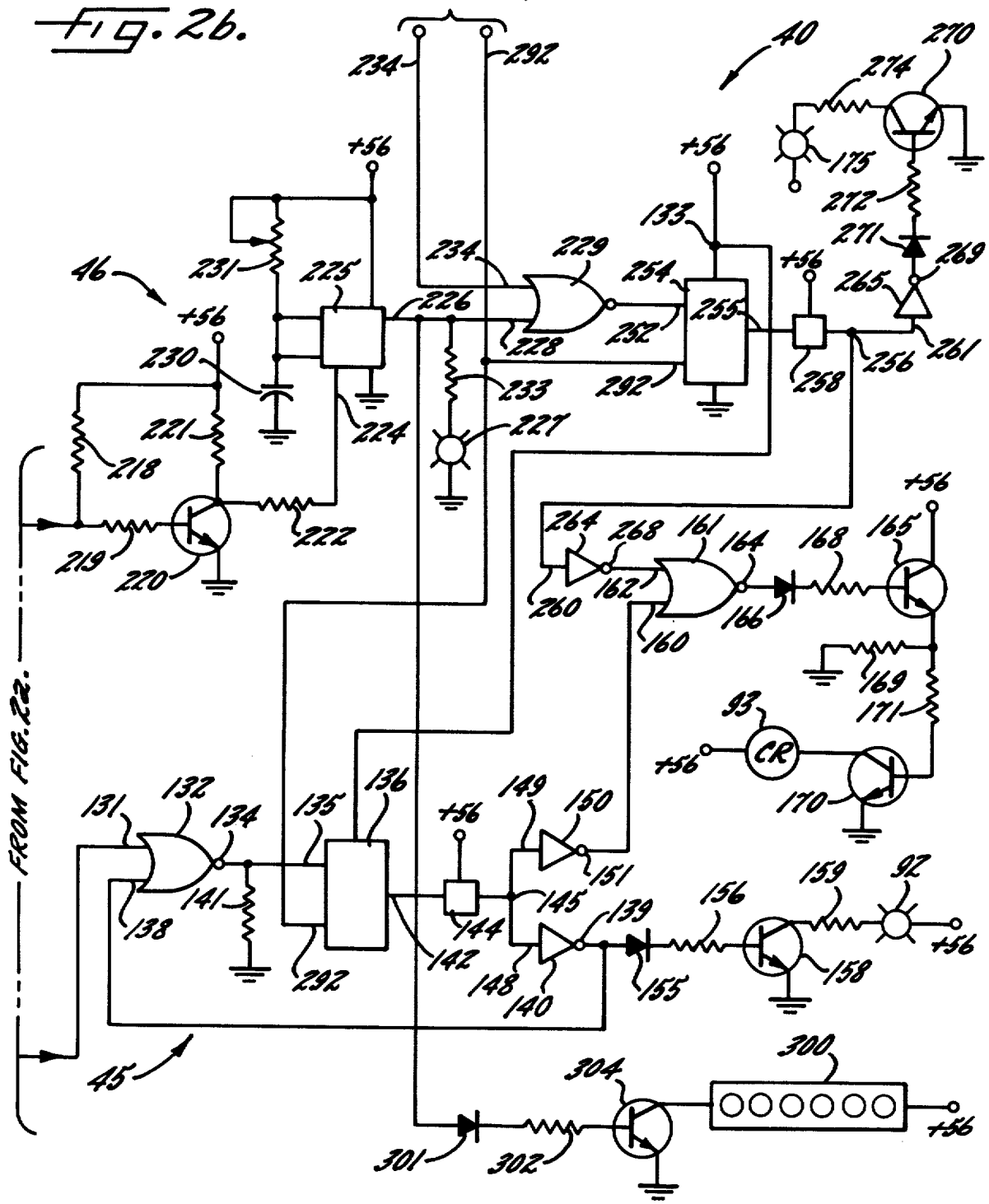

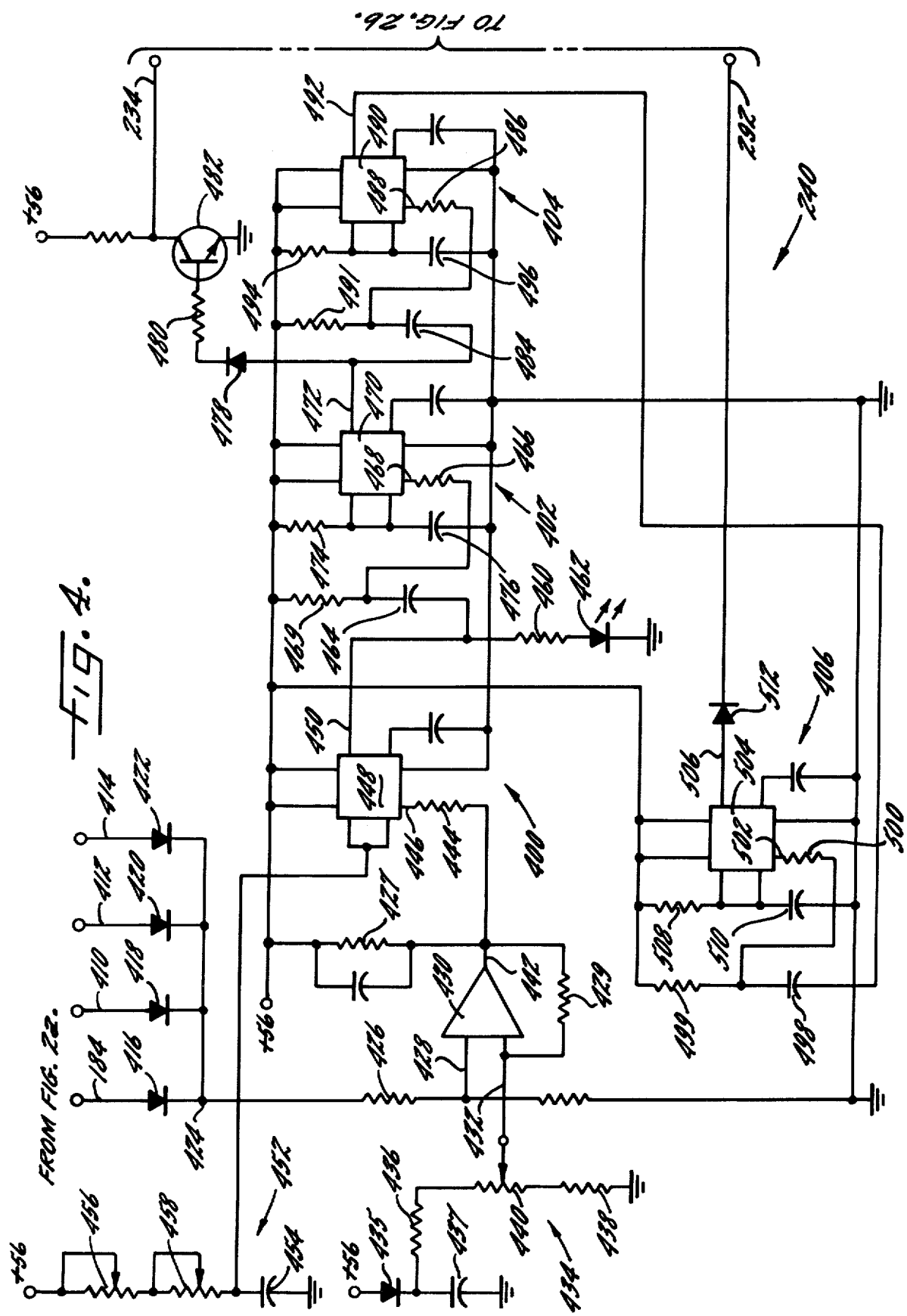

LOAD MONITORING SYSTEM WITH MEANS FOR GENERATING TIMING SIGNALS

The present invention relates generally to load monitoring systems, and more particularly, to systems for monitoring and controlling loads incurred by force carrying members, such as pitmans of production presses.

Load monitoring systems are known at present for indicating the loads on presses and for automatically detecting if the load incurred by the force carrying member exceeds a predetermined value or is below a predetermined value. Systems, such as shown in applicants' U.S. Pat. No. 4,062,055, have been found to be highly valuable in controlling costly overload breakdowns and detecting production line delays resulting from the failure of a workpiece to be loaded into the press at the appropriate time. Such systems in general provide a transducer attached to the force carrying member of the press which generates an electrical load signal substantially proportional to the load exerted on the force carrying member. In addition such systems provide a high load limit circuit and a low load limit circuit which respectively determine whether the load signal exceeds a predetermined value (an overload) or is below a predetermined value (an underload). As set forth in greater detail in U.S. Pat. No. 4,062,055, the ability to detect a overload and an underload of the press provides significant advantages in controlling the production of the press.

In order to implement the advantages of the load monitoring system disclosed in U.S. Pat. No. 4,062,055, it is necessary to provide a timing signal or check pulse to the low load limit circuit so that, at the appropriate time in each cycle of the press pitman, the low load limit circuit can be strobed by the check pulse in order to determine if the minimum load threshold has been exceeded or not. If, for example, the check pulse is not provided at the proper time with respect to the press achieving its full loading for a particular cycle, the low load limit circuit may erroneously sense the loading at some portion of the cycle where no load exists and give an erroneous indication of a low load. Therefore, it is necessary that the timing signal or check pulse be generated at a time which is in predetermined time relationship to the stroke of the press pitman.

In U.S. Pat. No. 4,062,055, the timing signal or check pulse is provided by a cam and limit switch. The cam is driven by the crankshaft of the press. The present invention provides a improvement over the mechanical operation of the cam and switch. First, the mechanical limit switch provides a relatively noisy timing signal as a result of contact bounce within the switch itself which may result in false strobing of the low load limit circuit. Second, many presses are not provided with a cam and limit switch, and they must be added on separately in order to utilize the advantages of the low load detection circuitry such as that disclosed in U.S. Pat. No. 4,062,055.

As a result, it is an object of the present invention to provide a timing signal generating means which, in response to the load signal generated by the transducer attached to the load carrying member of the press, produces timing signals, including a check pulse signal, in predetermined timed relationship to the application of the load to the force carrying member of the press.

It is another object of the present invention to provide a timing signal generating means to provide a check pulse signal to a low load limit circuit in proper timed relationship so that the low load limit circuit can detect when the load on the force carrying member fails to reach a minimum predetermined value.

It is a further object of the present invention to provide a timing signal generating means responsive to the load signal generated by the transducer to produce a plurality of timing signals all in predetermined timed relationship to the application of the load to the force carrying member which timing signals can be used to control other aspects of the production sequence of the press.

Other objects and advantages of the invention will become apparent upon reading of the following detailed description and upon reference to the drawings in which:

FIG. 2a and FIG. 2b are electrical schematic diagrams of the sensing circuit for the illustrated monitoring system;

Figure 1:
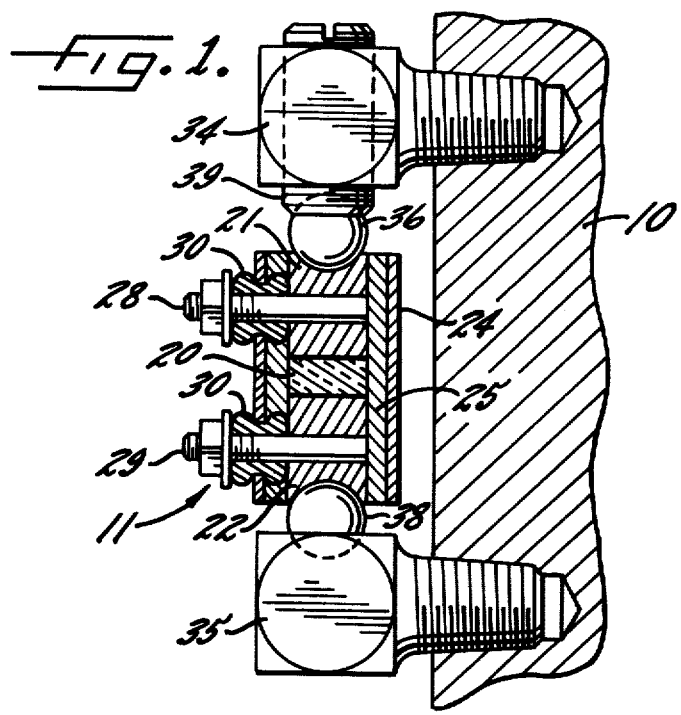
FIG. 1 is an enlarged fragmentary section of one of the stress sensing transducers utilized in the illustrated load monitoring system.
Figure 3:
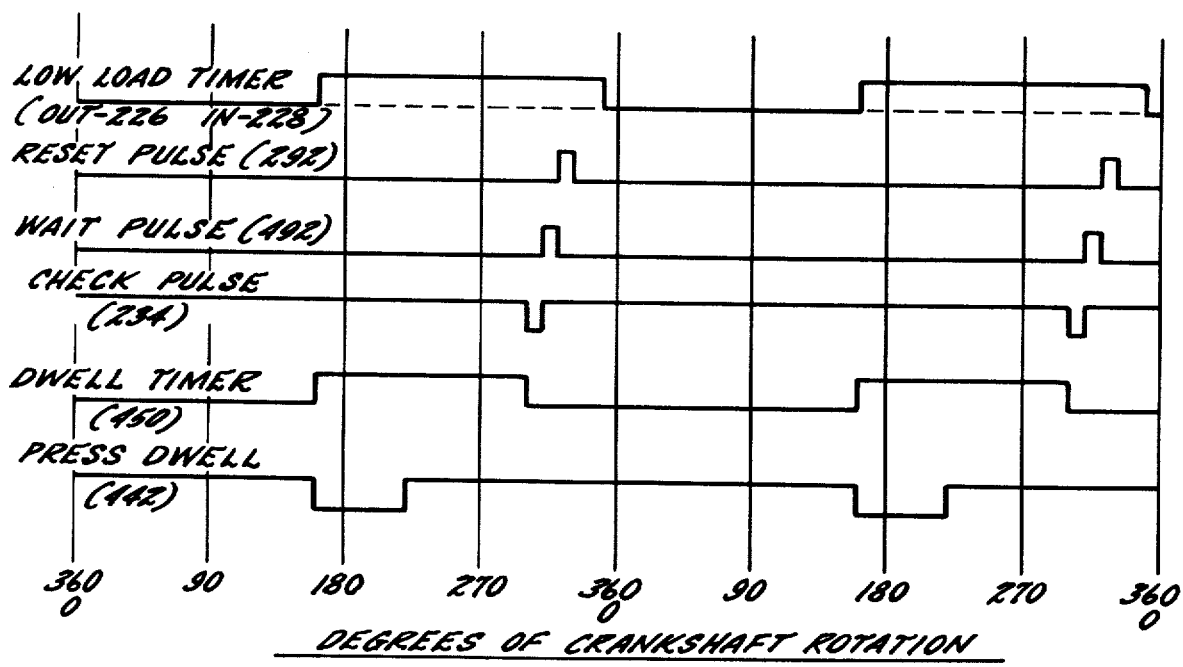
Figure 22:
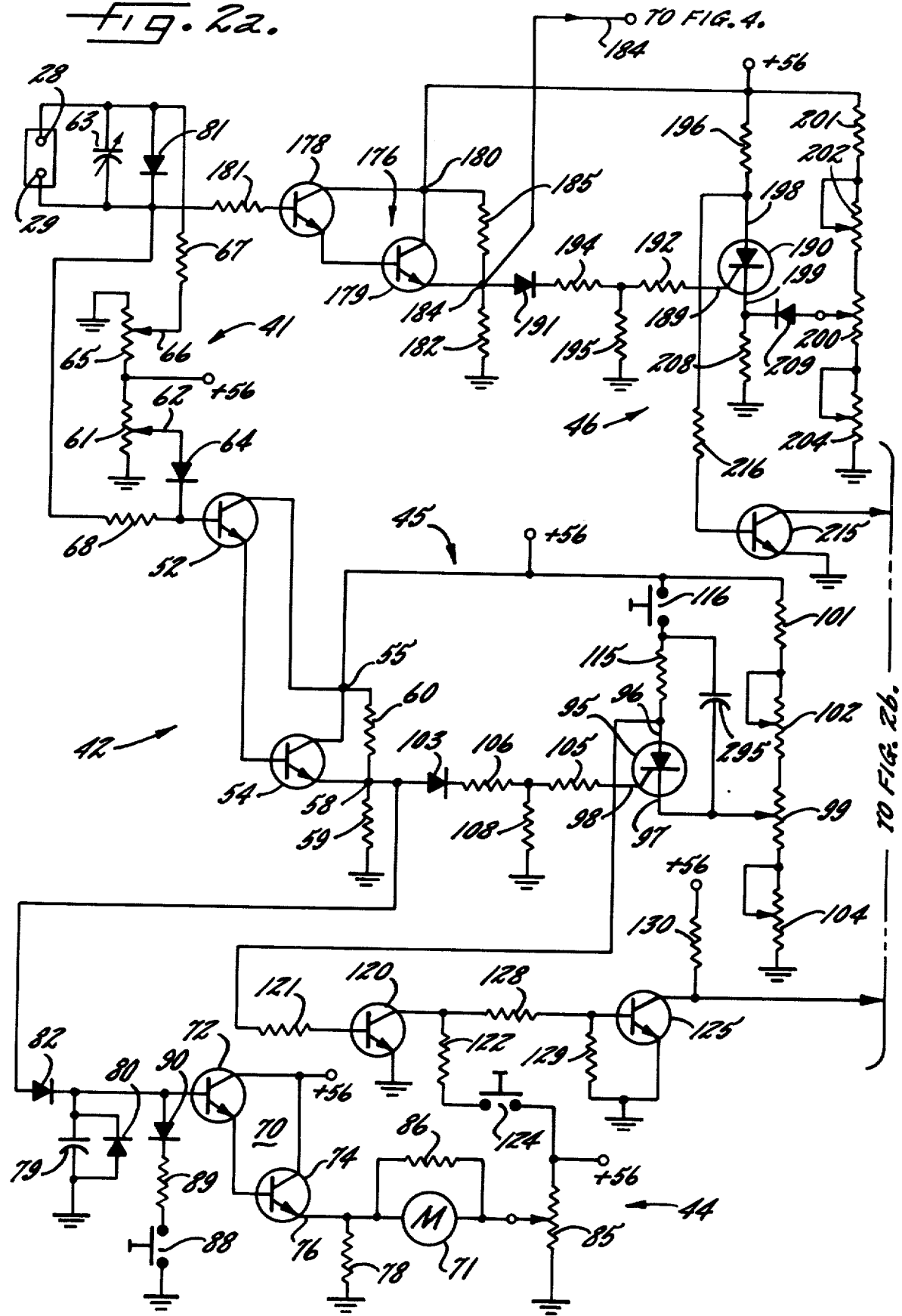

FIG. 3 is a timing chart illustrating the timed relationship of the various control pulses for two cycles of operation of a press; and FIG. 4 is an electrical schematic of the timing signal generating circuitry which is responsive to the load signal generated by the transducer to produce a check pulse signal (and other timing signals) in predetermined time relationship to the application of the load to the force carrying member of the press.

While the invention is susceptible of various modifications and alternative constructions, a certain illustrative embodiment has been shown in the drawings and will be described below in detail. It should be understood, however, that there is no intention to limit the invention to this specific form disclosed, but on the contrary, the invention is to cover all modifications, alternative constructions, and equivalents falling within the spirit and scope of the invention.

Referring more particularly to the drawings, there is shown an illustrative system embodying the present invention for monitoring loads that are cyclically incurred by a force carrying member 10, such as the pitman of a production punch press. The system includes transducer 11, which may be of the type described in U.S. Pat. No. 3,612,966 issued to Frank R. Dybel, one of the co-inventors of the present invention. The transducer includes a piezoelectric ceramic crystal 20 positioned between a top terminal block 21 and a bottom terminal block 22, with the top and bottom faces of the crystal 20 being in contact with and against the surface of each of the respective terminal blocks.

The terminal blocks 21, 22 and crystal 20 in this case are surrounded by a metallic sheath 24 which serves as a magnetic and electric shield. The sheath 24 is slightly larger than the terminal blocks and crystal to provide space for a surrouding layer 25 of an encapsulating and insulating plastic material. Leading from the terminal blocks through the insulating layer 25 and the metallic sheath 24 are terminals 28, 29 with suitable connections for attachment of leads. The terminals 28, 29 and hence the terminal blocks are electrically insulated from the sheath 24 at the passageway therethrough by terminal insulators 30. The sheath 24 is grounded to the shield of the shielded cables by suitable connections, not shown.

The transducer 11 preferably is mounted on the pitman 10 so that a line normal to the crystal faces at the interfaces between the crystal 20 and the terminal blocks 21, 22 is parallel to and aligned with the stress to be measured in the pitman 10 when under load during a working cycle. The transducer 11 is supported between two points in spaced relation to the pitman 14 to provide what may be characterized as a parallel mechanical circuit for shunting a small portion of the stress in the member 10 to the transducer 11. The transducer in this case is clamped between the ends of two brackets 34, 35 that are screwed into the member 10. Then ends of the brackets 34, 35 between which the transducer is clamped are provided with ball and sockets in the terminal blocks 21 and 22, respectively. The brackets preferably are electrically insulated from the terminal blocks by the balls 36 and 38 which may be made of a refractory insulating material.

In order to permit desired prestressing of the transducer crystal 20, a set screw 39 is provided in the end of the top bracket 34. After the transducer 12 is in position, the set screw 39 is screwed to secure it under a clamping pressure that places the crystal 20 in a prestressed condition. The amount to which the crystal is prestressed must be sufficient so that it is in a stressed condition under all conditions of loading on the member. In such condition, during the working cycle of the press, the resulting changes in stress in the pitman 10 will act upon the transducer through its support bracketry 34, 35 and cause the piezoelectric 20 to produce relatively high voltage output signals proportional to the stress changes.

In accordance with the present invention, a timing signal generator is provided, and illustrated in FIG. 4, that can be advantageously utilized in connection with an overload/underload sensing circuit. Such overload/underload monitoring system includes circuitry for detecting whether the load signal, which is substantially proportional to the load exerted on the force-carrying member, exceeds a predetermined value (a high load-overload condition) or is below a predetermined value (a low-underload condition). The circuitry shown in FIGS. 2a and 2b, which is similar to the high and low load detecting circuit shown in U.S. Pat. No. 4,062,055, is merely illustrative of one manner in which overload and underload conditions can be simultaneously detected. In order to gain a full appreciation of the importance of the timing signal generating circuitry, it is helpful to describe an illustrative circuit for load monitoring in which the timing signal generating circuitry can be most advantageously used.

Referring to FIGS. 2a and 2b, there is disclosed an overload/underload sensing circuit 40 that includes an input circuit 41 for a current amplifier 42, a load indicating circuit 44, a high load limiting circuit 45 and a low load limiting circuit 46. The output terminals 28, 29 of the transducer 19 are coupled to the input circuit 41 for the current amplifier 42. The amplifier 42 consists of a pair of direct-coupled transistors 52, 54 of the NPN variety. In the configuration shown, the transistors form what is commonly called an emitter follower type Darlington pair in that they have their collectors connected together at a point 55 and with the emitter of the first transistor directly attached to the base of the second transistor. The collector connection 55 is tied directly to a positive DC supply 56 while the emitter terminal 58 constitutes the output terminal for the amplifier 42 and is connected to ground through a load resistor 59. A stabilizing resistor having a value at least ten times larger than the load resistor 59 connects the output terminal 58 to the positive supply 56. Typical silicon NPN transistors presently available may have current amplification factors of 100 or more when biased in their linear conductive range. Thus, in cascade, two such transistors will provide an amplification factor of 10,000. The input impedance of the amplifier 42 will be approximately 10,000 times the effective load resistance at the emitter terminal 58 which, for present purposes, will be at least 100 kilohms, making the input impedance to the amplifier 42 at least 1,000 megohms.

To obtain such a high input impedance from the amplifier 42 during static conditions, it is necessary to properly bias the input to render the transistors conductive in their linear range. To this end, the input circuit 41 includes a first voltage divider 61 connected between ground and the positive supply terminal 56. The voltage divider 61 in the present instance is variable through the movement of a wiper arm 62. The divider output voltage present on the wiper arm 62 is applied to the base of the transistor 52 via a diode 64 which is poled to allow bias current to flow into the transistor 52. It is desirable to establish a bias voltage on the wiper arm 62 of the voltage divider which will render the transistors 52 and 54 conductive near the lower current end of their linear region of conduction. Assuming the transistors 52, 54 and the diode 64 to be silicon devices, a voltage, such as about 1.8 volts, would have to be impressed across the three semi-conductor junctions before linear conduction is established. A second voltage divider 65, also in the form of a potentiometer, has a wiper arm 66 for establishing a reference voltage substantially equal to the bias voltage at the base of the first transistor 52 of the amplifier 42. The transducer 19 in this case is part of a branch that includes the transducer 19 itself, a pair of bandpass control resistors 67, 68 in series with the transducer, a reverse voltage shunt diode 81 in parallel with the transducer and a conditioning capacitor 63 in parallel with the transducer. With the voltages at the opposite ends of the transducer branch being equal to the static condition of the circuit, zero current will flow through the transducer while it is in its inactive condition.

When an increase in stress occurs in the piezoelectric transducer 19, such as when a compressive force is incurred by the press member during the working stroke of the press, the piezoelectric crystal 20 produces a voltage across the transducer with a positive voltage at terminal 29 of the transducer. Any negative voltage transient appearing at terminal 29 is shunted by diode 81 to protect the input amplifier 42. This voltage will be proportional to the stress applied, but it will be conditioned or limited by the loading effect of the capacitor 63 so that its full load output is approximately 10 volts. Since the capacitor 63 is parallel with the transducer 19, it does not act as an external biasing element so as to reduce the effectiveness of the transducer. As a result, as the voltage across the transducer rises, the output voltage from the amplifier 42 also rises in a 1:1 ratio. However, the current available to drive the emitter load resistors of the amplifier 42 will be several orders of magnitude greater than the transducer current. The only load impressed upon the transducer, other than that of its conditioning capacitor 63, will be the dynamic input impedance of the transistor pair 52, 54 and the reverse impedances of the directional diode 64, both of which are in excess of 10 meghoms and provide a degree of isolation for the transducer.

The indicating circuit 44 is connected to the output of the amplifier 42 at the emitter terminal output point 58 and includes a current amplifier 70 which in turn has its output connected to a suitable meter 71. The amplifier 70 again is a Darlington arrangement of direct coupled transistors 72, 74 having their collectors connected at a common point 75 and with the emitter of the first transistor attached to the base of the second transistor. The collector connection 75 is tied to the positive DC supply 56 while the emitter terminal 76 constitutes the output terminal for the amplifier 70 and is connected to ground through the resistor 78. Current flowing from the amplifier 42 charges a capacitor 79 connected in a line extending from the input of the transistor 72 to ground for providing a sufficiently prolonged voltage to maintain a current flow through the amplifier 70 and meter 71 to obtain the necessary meter reading. A directional diode 80 in this case is connected in parallel with the capacitor 79, and a diode 82 is included in the input line to prevent reverse current flow from the capacitor 79.

It will be seen that the output signal from the amplifier 70 into the meter 71 will be proportional to the stress communicated to the transducer 19 from the press pitman. To properly establish or calibrate the maximum and minimum readings of the meter, the output terminal of the meter 71 is connected to the wiper of a potentiometer 85 connected between ground and the positive supply terminal 56. A dampening resistor 86 is connected in parallel with the meter. The meter 71 in this case, when properly calibrated, is adapted to indicate the loading on the press as a percent of its rated or 100% capacity. Following a work stroke of the press and the resulting load indication by the meter 71, the meter may be quickly returned to zero by depressing a reset button 88 connected in series with the resistor 89 and a diode 90 which has the effect of unloading the capacitor to ground.

In order to limit the stress applied to the force carrying member to a predetermined value, the high load limiting circuit 45 is adapted for selectively controlling overload detection means, which in the illustrated embodiment includes an overload indicator light 92 and a main control relay 93 for the press. For this purpose, the high load limiting circuit 45 includes a control rectifier 95 having anode, cathode and gate terminals 96, 97 and 98, respectively with the cathode terminal 97 referenced to a variable voltage at the wiper of a potentiometer 99. The potentiometer 99 forms one part of a voltage divider connected between ground and the positive supply 56, which divider also includes a fixed resistor 101, a "coarse" control rheostat 102 and a "fine" control rheostat 104. The gate terminal 98 of the control rectifier 95 is connected to the output point 58 of the amplifier 42 through a directional diode 103, an input resistance 105 and a voltage divider consisting of resistors 106 and 108. The anode terminal 96 is coupled to the DC power supply 56 through a resistor 115 and a normally closed reset switch 116.

Several factors are operative to determine the transducer voltage necessary to trigger the rectifier into conduction for operating the overload indication means. The control rectifier 95, typically a silicon device designated as an SCR, is rendered conductive when the voltage at the gate terminal 98 exceeds the reference voltage at the cathode terminal 97 by a fixed amount. In the present instance, the forward current of the rectifier 95 is limited by the resistance of the lower branch or leg of the potentiometer 99, together with the resistance of the rheostat 104. The voltage at which the rectifier will trigger, therefore, can be selectively established by adjusting the reference voltage divider to the cathode 97. The potentiometer 99 can be manually adjusted so that, after proper calibration of the unit, the user may easily choose maximum loading that may be incurred by the force carrying member before the threshold voltage of the SCR is exceeded. When the loading on the press exceeds the potentiometer setting, the resulting transducer signal will trigger the rectifier 95 into conduction. The lower branch of the voltage divider for the cathode terminal 97 preferably is designed with a relatively low impedance so that once the SCR is triggered it will remain conducting until the system is manually reset.

Solid state logic means is provided for quickly and reliably acting upon the overload detection means in response to conduction of the SCR 95 and for indefinitely holding or locking in an overload indication until proper resetting of the system. To this end, the anode 96 of the SCR 95 is coupled to the base of a transistor 120 through a resistor 121. The emitter terminal of the transistor 120 is connected to ground while the collector terminal is coupled to the DC power supply 56 through a loading resistor 122 and a normally closed reset switch 124. The collector terminal of transistor 120 also is connected to the base of a transistor 125 through a voltage divider consisting of resistors 128 and 129. The transistor 125 similarly has its emitter terminal connected to ground and its collector terminal coupled to the DC power supply 56 through a resistor 130. The collector terminal of resistor 125 is coupled to an input terminal 131 of a NOR gate 132 which has an output terminal 134 coupled to a set point 135 of a solid state latch 136. The latch 136 is energized by the power supply 56 from a terminal 133 connected to the latch.

During normal operating conditions of the press, with the overload potentiometer 99 set at the rated loading for the press, the transducer signals to the gate 98 of the SCR 95 will not exceed the predetermined set threshold voltage at the control terminal 97 so that the SCR is in a nonconductive state with a relatively high voltage potential existing at the anode terminal 96 which feeds the base of the transistor 120. The high potential at the base of the transistor 120 causes the collector terminal of the transistor 120 and the base of the transistor 125 connected thereto to be drawn essentially to ground rendering the transistor 125 nonconductive and creating a high voltage potential at the collector terminal of that transistor and at the input terminal 131 of the NOR gate 132. Because the other input terminal 138 of the NOR gate 132 is coupled to an output terminal 139 of an inverting buffer 140, which during normal operation of the press is in a low state as will become apparent, the unlike potentials at the NOR gate input terminals 131, 138 creates a normally low state at the output terminal 134. The output terminal 134 is coupled to ground through a loading resistor 141 and, as indicated above, also to the set terminal 135 of the latch 136. The resulting normally low potential at the latch set terminal 135 maintains a high potential at a latch output terminal 142 which feeds through a normally conductive transmission gate 144 to create a high potential at an output point 145. For maintaining the transmission gate 144 in a conductive condition during normal operation, the DC power supply 56 is coupled to an enabling point of the gate in a known manner. The normally high potential at output point 145 feeds input terminals 148, 149 of respective inverting buffers 140, 150 to create normally low potentials at output terminals 139, 151 of the inverting buffers. As indicated previously, the low potential at the output terminal 139 of the inverting buffer 140 is coupled back to the input terminal 138 of the NOR gate 132 for maintaining it at its normally low state.

An operating circuit for the overload indication light 92 is coupled to the output terminal 139 of the inverting buffer 140. The output terminal 139 in the present instance is coupled through a directional diode 155 and a resistor 156 to the base of a transistor 158. The emitter terminal of the transistor 158 is connected to ground while a line including a loading resistor 159 and the overload indication light 92 connects the collector terminal of the transistor 158 to the DC power supply 56. It can be seen that during normal operating conditions of the press, the low potential at the inverting buffer output terminal 139 causes the transistor 158 to be in a nonconductive condition causing a high resistance that prevents current flow through the light 92.

The press control relay 93 is included in a circuit coupled to the output terminal 151 of the inverting buffer 150 and in this case is maintained in a normally energized condition. To this end, the inverting buffer output terminal 151, which is at a normally low potential, is coupled to an input terminal 160 of a NOR gate 161. The NOR gate 161 has a second input terminal 162 which, as will become apparent, also is maintained in a normally low potential, so that output terminal 164 of the NOR gate 160 is maintained at a normally high potential. The NOR gate output terminal 164 feeds the base of a transistor 165 through a diode 166 and resistor 168. The collector terminal of the transistor 165 is connected to the DC power supply 56 and the emitter terminal is connected to ground through a resistor 169 and to the base of a second transistor 170 through a resistor 171. The emitter terminal of the transistor 170 is connected to ground, and the collector is coupled to the DC power supply 56 by a line that includes the overload relay 93. It will be seen that the normally high potential at the output terminal 164 of the NOR gate 161 feeds the base of the transistor 165 causing that transistor to be in a conductive state so that substantially the entire voltage appears across the resistor 169 creating a high potential at the emitter terminal of the transistor 165 which in turn feeds the base of the transistor 170. The transistor 170 is thereby in a normally conductive state causing the collector terminal thereof to be drawn essentially to ground to permit conduction through the relay 93. It will be understood that the energized relay 93 may be utilized to maintain a suitable clutch control switch for the press in a closed position to permit operation of the press.

In the event that the loading on the press member being monitored exceeds the setting on the overload control potentiometer 99, the amplified transducer signal to the SCR gate 98 will exceed the predetermined threshold voltage causing the SCR to become conductive. In response to this event, the foregoing logic circuitry will instantaneously and reliably energize the overload indication light 92 and de-energize the main clutch control relay 93 to permit the clutch control switch to be opened for shutting down the press. It will be seen that when the SCR is rendered conductive on an overload, the anode terminal 96 and the base of the transistor 120 connected thereto are drawn essentially to ground. The lowering of the base potential of the transistor 120 will create a high potential at its collector terminal which feeds the base of the transistor 125 causing the transistor then to become conductive, drawing its collector terminal to ground and causing a low potential at the input terminal 131 of the NOR gate 132. Since the input terminal 138 also is at a low potential, the like low inputs to the NOR gate cause the output terminal 134 to go to a high potential which feeds the set point 135 of the latch 136 in turn causing the latch output terminal 142 to go to a low potential drawing the point 145 and inputs 148 and 149 of the inverse buffers 140, 150 to a low potential through the open transmission gate 144. The low potentials at input terminals 148 and 149 will cause the output terminals 139 and 151 of the respective inverse buffers to go high. The high potential at the terminal 139 feeds the base of the transistor 158 causing is collector to be pulled essentially to ground so as to cause conduction through the overload indication light 92.

Simultaneously, the control relay 93 will be de-energized for stopping the press. When the inverting buffer output terminal 151 goes high the resulting high potential will be directed to to NOR gate input terminal 160. Since the input terminal 162 remains at a low potential, the unlike inputs will cause the output terminal 164 of the NOR gate 161 to drop to a low potential drawing down the base of the transistor 165 and rendering it nonconductive. As a result, the voltage drop between the DC power supply 56 and ground will be essentially across the transistor 165 causing the emitter terminal to go to a low potential which draws down the base of the transistor 170 rendering it nonconductive and creating a high impedance that prevents further current flow through the control relay 93. Such de-energization of the relay 93 can be utilized to open the main clutch control switch for the press and shut down its operation.

The low load limiting circuit 46 includes solid state logic means adapted to also de-energize the control relay 93, as well as energize a low load indication light 175, when the loading on the press member fails to reach a preset value. The circuit 46 includes a low load limiting amplifier 176 consisting of a pair of transistors 178, 170 directly coupled in a Darlington arrangement with their collectors connected at a common point 180, and the emitter of the first transistor 178 directly attached to the base of the second transistor 179. The base of the first transistor 178 is connected to the transducer terminal 29 through a resistor 181, and the emitter terminal of the second transistor 179 is coupled to ground through a loading resistor 182. The collector connection 180 is tied directly to the DC power supply 56, and a stabilizing resistor 185 connects output 184 of the amplifier to the power supply 56. The output point 184 of the amplifier 176 feeds a gate terminal 189 of a silicon controlled rectifier 190 through a directional diode 191, an input resistance 192, and a voltage divider consisting of resistors 194 and 195. The SCR 190 has its anode terminal 198 connected to the DC power supply 56 and its cathode terminal 199 coupled to ground through a stabilizing resistor 208.

For selectively controlling the conductive state of the SCR 190, and in turn the underload indication means, as will become apparent, the cathode terminal 199 also is referenced to a variable voltge at the wiper of a potentiometer 200. The potentiometer 200 forms one part of a voltage divider connected between ground and the positive power supply 56, which divider also includes a fixed resistor 201, a "coarse" control rheostat 202, and a "fine" control rheostat 204. The threshold voltage at which the rectifier 190 will conduct, therefore, can be established by adjustment of the reference voltage divider to which the cathode 199 is coupled. The potentiometer 200 can be manually adjusted and may be calibrated in terms of a percentage of the rated press capacity. In this case, however, it is intended tha the potentiometer 200 be set slightly below, such as 1 or 2 percent, the desired minimum loading on the press member during the normal working stroke. During normal operation of the press, therefore, the loading on the press member will exceed the minimum load setting on the potentiometer 200, and as a result, the amplified transducer signal to the rectifier gate 189 will exceed the predetermined reference voltage at the cathode terminal 199 so as to render the rectifier conductive during each stroke of the press.

The SCR 190 is adapted to conduct only for a short pulse each time it is fired and then automatically return to a nonconductive state. In the present instance, in order to limit the current flow through the rectifier 190 to a short pulse during each firing, the anode terminal 198 is connected to the power supply through a high impedance resistor 196, such as on the order of 2 megohms, and a diode 209 provided in the line connecting the cathode terminal 199 to the potentiometer 200 is poled to block current flow to the potentiometer. It will be seen that while the rectifier 190 is rendered conductive during each stroke of the press, because of the high impedance of the resistor 208, the current flow will be relatively small. Accordingly, when the transistor signal at the gate terminal 189 falls below the reference voltage at the cathode terminal 199 following the completion of the working stroke of the press, the rectifier 190 will again return to its inactive or nonconductive state.

In keeping with the invention, the low load limiting circuit 46 includes means responsive to failure of the rectifier 190 to become conductive during a working cycle of the press for indicating that the loading on the press member did not reach the preset value and for automatically shutting down the press. For this purpose, the anode 198 of the rectifier 190 is coupled to a circuit for controlling the low load indication light 175 and the main control relay 93. In the illustrated embodiment, the anode 198 is connected through a resistor 216 to the base of a transistor 215, the emitter terminal of which is grounded and the collector terminal of which is coupled to the base of a transistor 220 through a resistor 219. The collector terminals of the transistors 215, 220 each are coupled to the DC power supply through respective resistors 218 and 221. The emitter terminal of the transistor 220 also is grounded while its collector terminal is connected to the input terminal 224 of a low load timer 225 through a resistor 222. The low load timer 225 is coupled to the power supply 56 and has an output terminal 226 coupled to an input terminal 228 of a NOR gate 229. The low load timer 225 may be of a known "interval on" type, such as a Signetics Model No. 555 timer, which in response to a negative impulse to the input terminal 224 will permit conduction from the power supply 56 to the output terminal 226. For permitting selective adjustment of the timing interval, a capacitor 230 and adjustable resistor 231 are coupled to the timer in the usual manner.

To permit easy determination of whether the timer 136 is generating output pulses, either when setting the potentiometer 200 to a zero condition during initial calibration of the system or for observing the performance of the system, a light 227 and resistor 233 are coupled between the output terminal 226 of the timer and ground. Thus, each time the low load timer 225 is activated the output of the timer will not only feed the NOR gate input terminal 228 but will energize the light 227 for the interval of the timing cycle.

In carrying out the invention, NOR gate 229 has a second input terminal 234 which is connected to check pulse output 234 of timing signal generator 240 (FIG. 4). As will be described in greater detail, the check pulse signal at output 234 provides a low potential at the NOR gate input 234 for a predetermined, relatively short time during each cycle of the press at a time when low load timer 225 would be active as a result of the load exceeding the minimum reference value if the operation were normal. The relative timing of the check pulse (NOR input 234) and the low load timer signal (NOR input 228) is illustrated in FIG. 3. The solid line for the low load timer output represents normal operation and the broken line indicates underload operation. The timing is shown in FIG. 3 as degrees of rotation of the press crankshaft with the bottom dead center of the pitman stroke assumed to be at 180°. The timing shown in FIG. 3 is, illustrative only, and variations can be made as long as the check pulse occurs within the time duration of the low load timer signal (on input 228) for normal operation.

Returning to FIGS. 2a and 2b, the output terminal 250 of the NOR gate 229 is coupled through a diode 251 to a set point 252 of a solid state latch 254 which is normally energized from the terminal 133 of the DC power supply 56. The latch 254 has an output terminal 255 connected to an output point 256 through a normally conductive transmission gate 258 that is held in a conductive condition through the connection of its enabling point to the DC power supply 56. The output point 256 is connected to input terminals 260, 261 of respective inverting buffers 264, 265. The inverting buffer 264 has an output terminal 268 coupled to the input terminal 162 of the NOR gate 161. The inverting buffer 265 has an output terminal 269 coupled to the base of a transistor 270 through a diode 271 and a resistor 272. The emitter terminal of the transistor 270 is coupled to ground while a line containing a resistor 274 and the low load indicator light 175 is coupled between the collector terminal and the DC power supply 56.

The operation of the low load limiting circuit 46 can be best illustrated when the circuit diagram shown in FIGS. 2a and 2b are considered in the light of FIG. 3 which is a diagrammatic illustration of voltage sequence to the input terminals 228 and 234 of the NOR gate 229 during an operating cycle of the press. As described above, during normal operation of the press, the loads incurred by the press member being monitored will exceed the minimum load setting on the low load control potentiometer 200 causing the SCR 190 to become conductive for a short interval during each working cycle. When the rectifier 190 conducts, the anode terminal 198 is drawn to a lower potential which in turn lowers the potential at the base of the transistor 215. The lowering of the base potential of the transistor 215 increases the potential at the collector terminal of that transistor which in turn feeds the base of the transistor 220 causing it to become conductive drawing its collector terminal essentially to ground and resulting in a negative impulse to the input terminal 224 of the low load timer 225 to inititate the timing cycle. The low load timer 225, therefore, will feed the input terminal 228 of the NOR gate 229 with a high potential during the set interval. In the illustrated embodiment, the low load timer 225 is set so that upon triggering it conducts for a period of about 190° of crankshaft rotation.

The sequence of the low load timer output voltage to the NOR gate input terminal 228 is shown in FIG. 3 (solid line) in relation to the crankshaft position. It can be seen that the output of the low load timer does not conduct during the first 160° of crankshaft rotation so that the NOR gate input 228 is at a low potential. Just before the bottom dead center position of the press ram, the transducer signal is sufficiently great to trigger the SCR 190 which has the effect of activating the low load timer to create a high potential at the terminal 228 which exists for the next 190° of crankshaft rotation. At that point (approximately 350° of rotation), the low load timer automatically shuts off to return the NOR gate input 228 to a low potential during the remaining 10° of the cycle.

The sequence of the check pulse input to the NOR gate terminal 234 is also illustrated in FIG. 3. Press dwell is defined as the time during which the force bearing member of the press experiences loading. The line in FIG. 3 labeled "Press Dwell" indicates that the press may experience loading from approximately 160° to 220° of rotation. The timing signal generator circuit 240 (FIG. 4) generates the check pulse in response to the transducer load signal, and the check pulse appears at about 80° after the end of the press dwell time or at approximately 300° of rotation of the crankshaft of the press.

Thus, during normal operation of the press, the NOR gate input terminals 228 (low load timer signal) and 234 (check pulse signal) never simultaneously have low potentials, and as a result, the output terminal of the NOR gate is maintained at a low state. It can be seen in FIG. 3, that for the first 160° of crankshaft rotation the input terminals are at unlike potentials; from 160° to 300° both inputs are at a high potential; from 300° to 310° the terminals are at unlike potentials; from 310° to 350° the terminals are both at high potentials; and from 350° through the remainder of the cycle unlike potentials again exist at the input terminals. In order for the low level limit circuit to perform as just described, the check pulse must be timed so as to occur during the time that the low load timer's output is high thus indicating the load on the press is above the minimum load setting. If the check pulse occurs before 160° or after 350°, then both inputs would be low and an erroneous indication of a low load would result. It is for that reason that the check pulse must be produced in a timed relationship with the loading of the press by the timing signal generator 240. Accordingly, during normal operation of the press, the low potential at the output terminal 250 is communicated to the set point 252 of the latch 254 causing a high potential to be maintained at the latch output terminal 255. This high potential feeds through the transmission gate 258 and output point 256 to the input terminals 260 and 261 of the respective inverting buffers 264, 265 creating low potentials at their outputs 268, 269. The low potential at the inverting buffer output terminal 269 creates a low potential at the base of the transistor 270 which renders it nonconductive so that there is no current flow through the low load indication light 175.

The low potential at the output terminal 268 of the inverting buffer 264 is communicated to the input terminal 162 of the NOR gate 161. The other input terminal 160 of the NOR gate also has a low potential during normal operating conditions, as previously discussed, because there would be no overload condition. The similar low potentials at the input terminals 162 and 160 of the NOR gate 161 cause a high potential to be maintained at the output terminal 164 which feeds the base of the transistor 165. The transistor 165 is therefore conductive causing a high potential at its emitter terminal for feeding the base of transistor 170 rendering it conductive. As a result, current is permitted to flow from the DC power supply 56 through the main control relay 93 for maintaining the clutch control switch for the press in a closed operating condition.

In the event that the loading on the press member does not exceed the minimum loading set on the low load control potentiometer 200, the transducer signal to the gate terminal 189 of the rectifier 190 will not exceed the reference voltage at the cathode terminal 199. As a result, the SCR 190 will not be triggered for its usual short impulse during that cycle of operation. The anode terminal 198, therefore, will remain at a high potential feeding the base of the transistor 215 which in turn will maintain a low potential at the base of transistor 220 and a high potential at the input terminal 224 of the low load timer 225. Thus, during such an underloaded condition the low load timer 225 will not be actuated and a low potential will be maintained at the input terminal 228 of the NOR gate 229 throughout the complete cycle. In FIG. 3 the dotted line designated 277 indicates the low potential of the timer output from 160°–350° of crankshaft rotation for the underload condition.

The negative going check pulse appears for each cycle of the press during the interval of 300° to 310° of rotation. Thus, during an underload condition, upon the appearance of the check pulse both input terminals 228 and 234 of the NOR gate 229 will have low potentials which will trigger the gate terminal 250 thereof raising the output to a high potential. The high potential at the NOR gate output terminal 251 will then feed the latch set point 252 causing low potentials at the latch output 255, point 256, and inverter buffer input terminals 260 and 261, which in turn causes the respective output terminals 268 and 269 to go high. The high potential at the output terminal 269 feeds the base of the transistor 270 rendering it conductive so as to cause a current flow though the underload indication light 175, thereby energizing the light to indicate the underloaded condition.

Simultaneously, the high potential at the inverter buffer output terminal 268 raises the potential at the NOR gate input terminal 162. Since the NOR gate 161 will then have unlike inputs the output terminal 164 is reduced to a lower state drawing down the base of the transistor 165 which in turn lowers the potential of the emitter terminal of that transistor and the base of the transistor 170. As a result, the transistor 170 will assume a nonconductive state and prevent further current flow through the main control relay 93 de-energizing the relay causing the main clutch control switch for the press to be opened to shut down the press, all simultaneously with activation of the underload indicator light 175.

After a overload or underload has been detected, it is necessary to clear the overload latch 136 and under load latch 254 before the next cycle of the press. An input 292 is connected to the reset input of each latch 136 and 254. A reset pulse is provided on input 292 by the timing signal generator 240 at the end of each cycle to assure the latches are cleared in anticipation of the next cycle. FIG. 3 shows the relative timing of the reset pulse which occurs illustratively between 320° and 330° of rotation of the crankshaft.

The low load limiting circuit 46 may also be utilized to count the production of the press. For this purpose, in the illustrated embodiment a production counter 300 is coupled to the output of the low load timer 225 through a diode 301, a resistor 302, and a transistor 304, the emitter of which is gounded and the collector of which is connected to the DC power supply through a line which includes the counter. The counter 300 may be of a conventional type having a numerical display that will advance one-half digit upon being energized and the other half-digit upon de-energization. It has been shown above that during normal operation of the press the low load timer 225 is triggered on each working stroke of the press causing the timer to conduct for a short interval. During such activation of the timer, its output will feed the base of the transistor 304 causing it to become conductive to energize the counter and advance the readout one-half digit. At the end of the timing cycle, the transistor will return to its nonconductive state, de-energizing the counter to complete the digitation. Since during normal operation of the press the timer is activated each time a load is incurred during a working stroke, parts produced by the press may thereby be easily counted. If the press is empty during a working stroke the usual minimum loading would not be exceeded and neither the timer nor the counter would be activated.

According to the present invention the check pulse for strobing of the low load limiting circuit 46 is provided by the timing pulse generator 240. As previously stated, the check pulse is generated by the timing pulse generator in a predetermined timed relationship with the loading of the force carrying member itself. As a result, the check pulse is available to strobe the low load limit circuit at input 234 to NOR gate 229 at a time which corresponds to the time when the low load timer 225 has been activated (or should have been activated) in response to the load exceeding the minimum load setting of the potentiometer 200. Referring to FIG. 3, that simply means that the check pulse must reliably appear at the input 234 of NOR gate 229 between 160° of rotation and 350° of rotation. If the check pulse appears at any time other than within that time span, the low load limiting circuit 46 will erroneously detect that the minimum load has not been achieved and shut down the press erroneously.

In order to generate the check pulse in a predetermined time relationship with the loading of the force carrying member of the press and thus in a predetermined time relationship to the operation of low load timer 225, the timing signal generator 240 is activated by the output 184 of amplifier 176 of the low load limit circuit 46. Output 184 is the amplified version of the load signal produced by the transducer 19.

Referring to FIG. 4, the timing signal generator 240 includes dwell cycle circuit 400, check pulse circuit 402, wait circuit 404 and reset circuit 406. Each of the listed circuits (dwell cycle circuit, check pulse circuit, wait circuit and reset circuit) are essentially individual timing circuits connected in cascade fashion (the output of the dwell cycle circuit connected to the input of the check pulse circuit, the output of the check pulse circuit connected to the input of the wait circuit, the output of the wait circuit connected to the input of the reset circuit) so that the cascade connected timing circuits provide a series of predetermined time delays.

The load signal from the transducer (in amplified form) at the output 184 of amplifier 176 of the low load limit circuit 46 is connected to the timing pulse generator 240 at input 184. Inputs 410, 412 and 414 are provided so that the timing pulse generator 240 can be triggered by connection to a plurality of transducers attached to the load carrying members of a press. Each input, 184, 410, 412 and 414, includes respectively diodes 416, 418, 420 and 422. The diodes have their cathode terminal connected to common point 424 so that the highest load signal from any one of a plurality of transducers and the load signal with the longest duration will appear at common point 424 and thus provide the triggering input to the timing signal generator 240. The load signal on input line 424 of timing signal generator 240 represents and is proportional to the voltage produced by the transducer 19 and indicates the loading of the press during the operation of the press.

The load signal on line 424 is fed through resistor 426 to the negative input 428 of comparator 430 of conventional design having output biasing network 427 and feedback resistor 429. The comparator 430 also has positive input 432 which is connected to input biasing circuit 434. The biasing circuit 434, which includes diode 435, capacitor 437, resistor 436, resistor 438 and potentiometer 440, establishes a reference voltage at the positive input 432 of the comparator 430 so that when the positive load signal at negative input 428 of the comparator 430 reaches 2 to 3 percent of the full load signal from the transducer, the comparator is activated to produce a low potential at output 442. The low potential on output 442 remains until such time as the load signal at the input 428 again drops below the 2 or 3 percent value of the full load. As a result, the low signal on output 442 of comparator 430 represents the press dwell for the particular press being used. The press dwell signal on output 442 is shown in FIG. 3 and indicates that in general the press dwell can exist from approximately 160° to 220° of rotation of the crankshaft of the press. (Again 180° is defined as the bottom dead center of the pitman's stroke.)

The press dwell signal on output 442 is connected through resistor 444 to input 446 of dwell cycle timer 448. The dwell cycle timer 448 may be of a known "interval on" type, such as a Signetics Model No. 555 timer, which in response to a negative going pulse to the input 446 will cause an output terminal 450 to go to a high potential. As long as the input 446 stays at a low potential, the output 450 will stay at a high potential. Therefore, as long as the press dwell signal at the input 446 of dwell cycle timer 448 remains at a low potential, during the time of the dwell cycle (approximately 160° to 220°), the output 450 will remain high.

As soon as the press dwell signal returns to a high potential, dwell cycle timer 448 will begin to time out a predetermined time after which the output 450 will return to a low potential. In the illustrative embodiment indicated by the timing shown in FIG. 3, the dwell cycle timer 448 is biased so that output 450 remains at a high potential for approximately 80° of crankshaft rotation after the press dwell signal has returned to its high potential. The dwell cycle timer 448 is biased by dwell biasing network 452 which includes capacitor 454, "coarse" adjust rheostat 456 and "fine" adjust rheostat 458.

The output 450 of dwell cycle timer 448 is connected through resistor 460 to light-emitting diode 462. The positive portion of the output signal on output 450 of the dwell cycle timer causes the light emitting diode to conduct and produce a visual indication of the beginning of the dwell time of the press and allows the operator to set the biasing on the dwell cycle timer 448 to provide the correct delay for the dwell cycle circuit 400.

The output 450 of the dwell cycle timer 448 is also connected through capacitor 464 and resistor 466 to input 468 of check pulse timer 470. Input 468 is biased to a high potential by the DC voltage 56 fed through resistor 469 so that when the dwell cycle timer output signal at output 450 goes high (at approximately 160° of rotation), the resulting positive pulse connected through capacitor 464 and resistor 466 to input 468 has no effect on output 472 of check pulse timer 470, and output 472 remains at a low potential. When the output 450 of dwell cycle timer 448 subsequently goes low (at about 300° of rotation), the resulting negative going pulse is coupled through capacitor 464 and resistor 466 to input 468 of timer 470 causing input 468 to go low which in turn causes output 472 to go to a high potential. Subsequently capacitor 464 charges through resistor 469 allowing input 468 of timer 470 to return to a high potential. As soon as the input 468 has returned to a high potential, the timing operation of timer 470 commences to time out the time duration for which output 472 remains at a high potential.

The timing operation of check pulse timer 470 is established by the combination of resistor 474 and capacitor 476 so that check pulse timer 470 produces a short positive-going output pulse. Stated another way, check pulse timer 470 is connected as a one-shot, pulse shaper having a positive going output pulse of approximately 10° in time duration.

The positive check pulse signal output on output line 472 of the check pulse timer 470 is connected throught blocking diode 478 and resistor 480 to the base of transistor 482. The positive check pulse turns on transistor 482 for the duration of the positive check pulse causing the collector of transistor 482 to be connected through the transistor emitter to ground, thus producing a negative going check pulse on output line 234 of approximately the same duration as that of the positive going check pulse on output line 472.

As has been described in greater detail, the check pulse on output 234 is connected to input 234 (FIG. 2b) of the NOR gate 229 to provide the timing strobe for the proper operation of the low load limiting circuit 46. In addition, the check pulse signal on line 234 which occurs once for each cycle of the press can be used for other purposes. For example, the check pulse can be used to provide an indication by means of a suitable meter or indicator device the number of strokes per minute that a particular press is making. Moreover, the check pulse can be used as a timing pulse to initiate the timing circuitry for advancing piece parts into the press for operation, for ejecting parts from the press after the operation has been complete and for counting the number of operations that have been accomplished by the press for the purposes of maintenance.

The important consideration with respect to generating the check pulse is that it is generated as a result of the stroke of the pitman of the press being detected by the transducer. As a result, the timing of the check pulse can be established with respect to the stroke of the pitman thus allowing the check pulse to serve as a timing reference point from which automatic operation of the press or auxiliary equipment can be controlled accurately with respect to the timing of the pitman stroke itself. Providing the timing signal generator 240 to produce the check pulse in response to the pitman stroke itself eliminates the need for other mechanical devices such as cams and switches which are prone to mechanical failure and inaccuracies.

In addition to generating the check pulse signal by means of the timing signal generator 240, other timing signals can be generated which can be used in the control of the press. Specifically, a reset signal can be generated which can be used at the end of each cycle to clear, for example, the latches 254 and 136 of the overload/underload sensing circuitry 40. In order to provide such a reset pulse, the positive check pulse output signal on line 472 is connected through capacitor 484 and resistor 486 to input 488 of wait timer 490. When the positive check pulse signal on line 472 returns to its low potential at the end of the check pulse, input 488 of wait timer 490 goes to a low potential for a short period of time governed by the time constant of capacitor 484 and resistor 491. When the input 488 goes to a low potential in response to the check pulse signal on output 472 going to a low potential, output 492 of wait timer 490 goes to a high potential. As soon as input 488 has recovered to its high potential, wait timer 490 begins timing out a short time delay governed by time constant of resistor 494 and capacitor 496. As soon as wait timer 490 has timed out its particular predetermined time interval, output 492 returns to a low potential.

The wait signal on output 492 is then connected through capacitor 498 and resistor 500 to input 502 of reset timer 504. As soon as the wait timer signal on output 492 returns to a low potential, the resulting negative going pulse is connected through capacitor 498 and resistor 500 to cause input 502 to go to a low potential and output 506 of reset timer 405 to go to a high potential. After input 502 returns to a high potential with the charging of capacitor 498 through resistor 499, the reset timer 504 begins timing out a time delay determined by the time constant of resistor 508 and capacitor 510. The time delay provided by timer 504 is a short time delay so that the reset output signal on output line 505 is a short pulse.

The reset signal on line 506 is connected through diode 512 to output line 292. The output 292 is then connected to input line 292 (FIG. 2b) to provide a positive reset signal for latches 254 and 136. The timing of the reset pulse is shown in FIG. 3 and indicates that the reset pulse occurs between about 320° and 330° of rotation of the crankshaft of the press.

We claim as our invention:

1. A load monitoring system for monitoring loads that are cyclically applied to a force carrying member comprising:
   (a) a transducer mounted on the force carrying member for generating an electrical load signal substantially proportional to the load exerted on the force carrying member; and
   (b) timing signal generating means including a plurality of timers connected in cascade fashion, each timer operable to produce a timing signal output, the first of the cascaded timers being initiated by the load signal generated by the transducer to produce timing signals in predetermined timed relationship to the application of the load to the force carrying member.

2. The load monitoring system of claim 1, wherein the timing signal generating means further includes load signal reference means interconnected between the load signal generated by the transducer and the first of the cascaded timers, which load signal reference means establishes a reference value for the load signal so that a load signal exceeding the reference value will initiate the first of the cascaded timers.

3. The load monitoring system of claim 1, wherein the timing signal generating means includes:
   (a) a dwell cycle timer circuit responsive to the load signal generated by the transducer to produce a dwell signal at an output of the dwell cycle timer circuit which dwell signal provides an indication of the duration of the application of the load to the force carrying member;
   (b) a check pulse timer circuit connected to the output of the dwell cycle timer circuit and responsive to the dwell signal to produce a check pulse at an output of the check pulse timer circuit;
   (c) a wait timer circuit connected to the output of the check pulse timer circuit and responsive to the check pulse to produce a wait signal; and
   (d) a reset timer circuit connected to the output of the wait timer circuit and responsive to the wait signal to produce a reset pulse, each of the signals, the dwell signal, the check pulse, the wait signal and the reset pulse, being in predetermined timed relationship to the application of the load to the force carrying member.

4. The load monitoring system of claim 3 wherein the timing signal generating means further includes load signal reference means interconnected between the load signal generated by the transducer and the dwell cycle timer circuit, which load signal reference means establishes a reference value for the load signal so that a load signal exceeding the reference value will initiate the dwell cycle timer circuit.

5. A load monitoring system for monitoring loads of varying value and duration that are cyclically applied to force carrying members comprising:
   (a) a plurality of transducers each mounted respectively on the force carrying members, each transducer operable for generating an electrical load signal, each signal being substantially proportional to the value of the load exerted on each force carrying member; and
   (b) a timing signal generating means including a plurality of inputs each respectively connected to one of the plurality of transducers for receiving a load signal from the transducers, the inputs being logically interconnected so that the timing signal generating means operates to produce timing signals in predetermined timed relationship to the application of the load of longest duration to one of the plurality of force carrying members.

6. A load monitoring system for monitoring loads that are cyclically applied to a force carrying member during a loading cycle comprising:
   (a) a transducer mounted on the force carrying member for generating an electrical load signal substantially proportional to the load exerted on the force carrying member; and
   (b) a low load limit circuit for detecting when the load on the force carrying member fails to reach a predetermined minimum value during the loading cycle including:
      (1) reference voltage generating means for selectively establishing a reference voltage at the low load limit circuit;
      (2) low load detector means which produces a low load signal in response to the failure of the load signal to exceed the value of the reference voltage;
      (3) timing signal generating means responsive to the load signal generated by the transducer to produce a check pulse in predetermined timed relationship to the application of the load to the force carrying member; and
      (4) logic means connected to the timing signal generating means and the low load detector means and operable to sense the existence of the low load signal at a time established by check pulse to produce an indication of a low load condition.

7. The load monitoring system of claim 6, wherein the timing signal generating means includes:
   (a) a dwell cycle timer circuit responsive to the load signal generated by the transducer to produce a dwell signal at an output of the dwell cycle timer circuit, which dwell signal provides an indication of the duration of the application of the load to the force carrying member;
   (b) a check pulse timer circuit connected to the output of the dwell cycle timer circuit and responsive to the dwell signal to produce a check pulse at an output of the check pulse timer circuit;
   (c) a wait timer circuit connected to the output of the check pulse timer circuit and responsive to the check pulse to produce a wait signal; and
   (d) a reset timer circuit connected to the output of the wait timer circuit and responsive to the wait signal to produce a reset pulse, each of the signals, the dwell signal, the check pulse, the wait signal and the reset pulse, being in predetermined time relationship to the application of the load to the force carrying member.

* * * * *